Patented Oct. 30, 1934

1,979,018

UNITED STATES PATENT OFFICE 1,979,018

PROCESS OF ABSORBING ETHYLENE IN STRONG ACIDS

Adrianus Johannes van Peski, Amsterdam, Netherlands, assignor, by mesne assignments, to Shell Development Company, San Francisco, Calif., a corporation of Delaware No Drawing. Application May 20, 1930, Serial No. 454,197. In Great Britain June 4, 1929

14 Claims. (Cl. 260—99.12)

This invention concerns an improved method of absorbing ethylene in suitable strong acids and it concerns also the production of the corresponding esters, ethers, alcohols or other compounds therefrom.

It is an object of the invention to provide a method of the aforesaid nature, by which the rate of absorption may be considerably increased as compared with that of the known processes of absorbing ethylene in strong acids. Another important object of the invention is to avoid entirely or as far as possible the formation of undesirable oily polymerization products, which are frequently formed when absorbing ethylene in the above-mentioned manner by the usual methods.

It is known that ethyl alcohol may be obtained by combining ethylene with sulphuric acid and hydrolyzing the sulphate obtained. Besides alcohols other compounds such as esters or ethers may be prepared by first absorbing ethylene in sulphuric acid and then converting the reaction products in a known manner.

The rate of absorption of ethylene by means of sulphuric acid in the usual way is generally slow. Different catalysts have been proposed for increasing the rate of absorption; a large group of very active catalysts for said purpose have been described in British Patent No. 323,748. It has now been found that other substances also serve to facilitate the reaction.

According to the invention the improved method of absorbing ethylene in strong acids in the presence of catalysts is characterized by employing as catalysts those comprising one or more of the metals or the compounds of the platinum group in finely divided condition and preferably brought on to a carrier.

The invention also consists in employing as the absorption media strong acids containing, as catalysts, compounds of the metals of the platinum group or compounds of copper, iron, cobalt or nickel in a soluble form.

If the metals of the platinum group for example, platinum, palladium, osmium, iridium and the like or compounds thereof are used they should preferably be brought into a very finely divided condition, for example colloidally precipitated on a carrier, such as carbon black, silica gel, decolorizing clay or the like.

If as the catalysts copper, iron, nickel or cobalt or soluble or insoluble compounds thereof are employed, those metals or compounds which are insoluble in the strong acid must first be brought into a soluble form for example by converting them into a soluble complex compound by means of carbon monoxide or nitric oxide (NO).

Thus for example cuprous oxide ($Cu_2O$) may be added to sulphuric acid, then carbon monoxide is passed through the mass, whereby a soluble complex compound of the type $Cu_2SO_4(CO)_x$ is formed, which acts as a catalyst for the absorption of ethylene in the sulphuric acid.

In the same way metallic copper may be added to the sulphuric acid, which with carbon monoxide yields the aforesaid soluble complex compound.

The compounds of the platinum group may also, if desired, be brought into a soluble form, for example potassium platinochloride ($K_2PtCl_4$) may be added to sulphuric acid, giving a dark brown suspension. Carbon monoxide is then passed through the mass, which becomes lighter in color owing to the formation of a soluble complex compound which has excellent catalytic properties for the absorption of ethylene. Instead of carbon monoxide, nitric oxide (NO) may be employed, which, for example with cuprous sulphate, forms soluble complex compounds of the type $Cu_2SO_4(NO)_x$.

The following examples illustrate how the method of this invention may be carried into effect:

1. A gas containing 93% of ethylene is passed through 100 ccs. of 96 per cent sulphuric acid, in which 5 grams of cuprous cyanide is dissolved. At a temperature of 15° C. 61 per cent of the gas is absorbed. If the cuprous cyanide content is increased, the percentage of the absorption is still higher.

2. 5 grams of cuprous oxide are added to 100 ccs. of 96 per cent sulphuric acid and carbon monoxide is then passed through the mass. Nearly the whole of the cuprous oxide is dissolved thereby. When ethylene is passed through the mass thus obtained, 72 per cent of the ethylene is absorbed.

3. 5 grams of cuprous oxide are added to 100 ccs. of 96 per cent sulphuric acid, nitric oxide (NO) is then passed through the mass, giving a red-violet solution. This solution is capable of absorbing 40 per cent of the ethylene which is passed through it.

4. 5 grams of potassium platinochloride ($K_2PtCl_4$) are added to 100 ccs. of 96 per cent sulphuric acid. After carbon monoxide has been passed through the mass, a soluble complex compound is formed with the platinum compound. Ethylene is absorbed with a very good yield.

Also cupric compounds, for example cupric sulphate ($CuSO_4$) or cupric chloride ($CuCl_2$) may be brought into a soluble form by combining the same with nitric oxide in the presence of sulphuric acid. Thus, for example, a solution of the complex compound obtained by passing nitric oxide through sulphuric acid, to which cupric chloride ($CuCl_2$) had been added, absorbs 40 per cent of the ethylene which was passed through it.

Cuprous compounds generally are more quickly dissolved by carbon monoxide than cupric compounds and cuprous compounds are more quickly dissolved by nitric oxide than by carbon monoxide. In the claims, nitric oxide is to be considered as an equivalent of carbon monoxide.

If desired, also soluble compounds of the metals aforementioned may be brought into a more active state by first combining them with carbon monoxide or nitric oxide to form soluble complex compounds therewith.

The reaction may be performed at ordinary, lower or higher pressures and temperatures. Other acids such as phosphoric acid may also be used as absorption liquids.

Moreover this process may be carried out in the presence of other substances which are known to accelerate the absorbing reaction, such as foam- or froth-forming substances, emulsifiers and the like. Furthermore the ethylene to be absorbed may be dissolved in suitable solvents before being brought into contact with the strong acid.

The aforementioned catalysts may also be used together with other substances which are known to promote the absorption of ethylene.

In order to promote the solubility of the ethylene in the strong acid the latter may be diluted with suitable solvents, for instance alcohol, acetic acid, nitrobenzene or ether.

The strong acids containing absorbed ethylene are subjected to treatment such as by hydrolysis and/or distillation or in other known manner for the production of compounds such as alcohols, esters or ethers.

Furthermore the method of this invention may be applied to gases, such as natural gas, "cracked" gas or the like, which contain a certain amount of ethylene and/or other olefines, without previously separating the said ethylene and/or other olefines from the gases.

What I claim is:

1. A method of absorbing ethylene in a strong acid, comprising effecting the absorption of the ethylene in the strong acid in the presence of catalysts added to the acid, which catalysts consist of compounds of a metal of the iron group soluble in said strong acid, and which compounds have been converted to soluble complex compounds by the passage of carbon monoxide through the acid after they have been added thereto.

2. A method of absorbing ethylene in a strong acid, comprising effecting the absorption of the ethylene in the strong acid in the presence of catalysts consisting of a metal of the iron group added to said strong acid and brought into solution in said acid by the passage of carbon monoxide therethrough.

3. An improved method of absorbing ethylene in strong acids in the presence of catalysts, which is characterized by employing as absorption media strong acids containing as catalysts soluble compounds of the metals of the platinum group, which are obtained from compounds that are insoluble in the strong acids by means of carbon monoxide passed therethrough.

4. An improved method of absorbing ethylene in strong acids in the presence of catalysts, which is characterized by employing as absorption media strong acids containing as catalysts soluble compound of a metal of the iron group which are obtained from compounds that are insoluble in the strong acids by means of carbon monoxide passed therethrough.

5. A method of absorbing ethylene in a strong acid comprising effecting the absorption in the presence of a catalyst consisting of a compound of copper which is soluble in said strong acid.

6. A method as set forth in claim 5, wherein compounds of copper which are soluble in the strong acid are added thereto, and the soluble compounds are converted to soluble complex compounds by means of carbon monoxide passed therethrough.

7. A method as set forth in claim 5, wherein the catalyst comprises soluble compounds of copper, which are obtained from compounds that are insoluble in the strong acid by means of carbon monoxide passed therethrough.

8. A method as set forth in claim 5, wherein the catalyst comprises soluble compounds of copper, which are obtained by adding metallic copper to the strong acid and effecting the dissolution therein by introducing carbon monoxide into the acid containing the copper.

9. A method of absorbing ethylene in a strong acid, comprising effecting the absorption in the presence of a catalyst consisting of compounds of copper which are insoluble in the strong acid and which have been brought into a soluble form within the said acid.

10. A method of absorbing ethylene in a strong acid comprising contacting the ethylene and acid in the presence of cuprous cyanide.

11. A method of absorbing ethylene in a strong acid comprising contacting the ethylene with the strong acid having cuprous cyanide dissolved therein.

12. A method of absorbing ethylene in a strong acid comprising adding a metal containing substance to the acid, the metal of which is selected from the group consisting of copper and metals of group 8 of the periodic system, introducing carbon monoxide into the acid containing the metal to form a catalytic soluble complex metallic compound in the acid and then contacting the ethylene with the acid containing the catalytic soluble complex metallic compound.

13. A method of absorbing ethylene in strong acid in the presence of a catalyst, comprising effecting the absorption of the ethylene in a strong acid containing as catalyst at least one soluble compound of a metal of the iron and platinum groups, which contains a solubilizing CO group.

14. A method of absorbing ethylene in strong acid in the presence of a catalyst, comprising effecting the absorption of the ethylene in a strong acid containing as catalyst a soluble compound of copper which contains a solubilizing CO group.

ADRIANUS JOHANNES van PESKI.